United States Patent [19]
Arai et al.

[11] Patent Number: 5,386,496
[45] Date of Patent: Jan. 31, 1995

[54] METHOD AND DEVICE FOR NONLINEAR TRANSFORMATION OF COLOUR INFORMATION BY NEURAL NETWORK

[75] Inventors: Yoshifumi Arai; Yoshiki Nakano, both of Tokyo, Japan

[73] Assignee: Toyo Ink Mfg. Co., Ltd., Tokyo, Japan

[21] Appl. No.: 822,874

[22] Filed: Jan. 21, 1992

[30] Foreign Application Priority Data

| Feb. 15, 1991 | [JP] | Japan | 3-043028 |
| Feb. 15, 1991 | [JP] | Japan | 3-043029 |
| Feb. 15, 1991 | [JP] | Japan | 3-043030 |
| Dec. 26, 1991 | [JP] | Japan | 3-357689 |
| Dec. 26, 1991 | [JP] | Japan | 3-357690 |

[51] Int. Cl.$^6$ ............ G01J 3/46; G06F 15/18
[52] U.S. Cl. .................. 395/22; 395/21; 358/518
[58] Field of Search ............ 395/21, 22; 358/80

[56] References Cited

U.S. PATENT DOCUMENTS

| 5,025,282 | 6/1991 | Nakamura et al. | 355/38 |
| 5,185,850 | 2/1993 | Usui et al. | 395/22 |
| 5,200,816 | 4/1993 | Rose | 358/80 |

FOREIGN PATENT DOCUMENTS

| 4113236 | 4/1992 | Japan | G01J 3/46 |

OTHER PUBLICATIONS

Parkkinen et al., "Color Analysis by Learning Subspaces and Optical Processing", IEEE Intl. Conf. on Neural Networks, Jul. 1988, II-421 to II-427.
Usui et al., "Neural Network Model of Color vision", IEEE Engineering in Medicine & Biology Soc. 11th Annual Intl. Conf., Nov. 1989, 2044-2045.
Usui et al., "Reconstruction of Munsell Color Space by a Five-Layered Neural Network," IJCNN, Jun. 1990, II-515 to II-520.
Leen et al., "Hebbian Feature Discovery Improves Classifier Efficiency," IJCNN, Jun. 1990, I-51 to I-56.
Liu et al., "Colour Image Processing by a Neural Network Model," Intl. Neural Network Conf., Jul. 1990, I, 3-6.
Usui et al: "A Three-Layered Neural Network Model for Color Vision", INNC, pp. 492-495 (1990).
McClelland et al: "Explorations in Parallel Distributed Processing", MIT Press, pp. 1-3, 137-152 (1988).
Laihanen: "Colour Reproduction Theory Based on the Principles of Colour Science", Adv. Print Sci. Tech. (1988).
(In Japanese) Miyahara et al: "Mahematical Transformation of (R,G,B) Color Data to Munsell (H,V,C)" Color Data, Journal, TV. Ass., vol. 43, No. 10, pp. 1129-1136 (1989).
(In Japanese) Suzuki et al: "Transformation of (RGB) Color Space to (YMCK) Color Space", Singaku Giho, vol. 90, No. 331, pp. 9-16 (1990).
(In Japanese) Naka et al: "Colour Modification of Colour Hard Copies by Neural Network", Gazo-denshigaku Kenkyukai, Paper vol. 110, pp. 13-18 (1989).

*Primary Examiner*—Robert W. Downs
*Attorney, Agent, or Firm*—Stevens, Davis, Miller & Mosher

[57] ABSTRACT

Color information such as a combination of fundamental colors in the subtractive or additive color mixing, hue, chroma and value in the psychological attributes of color, or coordinate values in a uniform color space are transformed nonlinearly and mutually by using a neural network, particularly a multi-layered feedforward neural network sufficiently trained of the transformation on samples of known data.

4 Claims, 11 Drawing Sheets

METHOD AND DEVICE FOR NONLINEAR TRANSFORMATION OF COLOUR INFORMATION BY NEURAL NETWORK

BACKGROUND OF THE INVENTION

1. Field of the Invention

The present invention relates generally to a computer processing of colour information, and more particularly to a method of and a device for transforming colour information for use in different colour processing and/or reproduction systems or devices such as computers, CRTs, colour printers, colour copiers, and so on.

2. Description of the Prior Art

Color information generally comprises a combination of at least three colour data, including a set of colour components such as cyan (C), magenta (M) and yellow (Y) or cyan (C), magenta (M), yellow (Y) and black (K) in the subtractive colour mixing, or red (R), green (G) and blue (B) in the additive colour mixing, three psychological attributes of colour such as hue (H), chroma (C) and value (V), and so on. Further, the concept of uniform colour space is known in the field of colour science, assuming a three dimensional space defined by three coordinates having scales of L*, a* and b*, respectively.

Artificial reproduction of colours is generally obtained by either giving a certain colour uniformly over the entire area when viewed as of each minute unit area of an object so that the colour on such each minute unit area provides directly the colour at that portion of the object, or by dividing each minute unit area of an object into a plurality of, generally 2 to 8, sub-unit areas separated from one another or overlapped in part with one another and giving different colours on the respective sub-unit areas so that those different colours provided by a set of sub-unit areas produce a required colour at that portion of the object as a result of mixing of colour in the retina. The photogravure printing by CMY is an example of the former art of uniformly colouring each minute unit area, according to the subtractive colour mixing, and a spot light by RGB is an example of said former art, according to the additive colour mixing. The process printing by CMY is an example of the latter art of differently colouring sub-unit areas of each minute unit area, according to the subtractive colour mixing, and a colour display by RGB is an example of said latter art, according to the additive colour mixing.

According to the developments of printing techniques and digital computers in these years there have been developed various systems for editing and operating digital pictures and/or characters obtained by a scanner, on the computer display, so as to reproduce colour images by various colour output devices such as colour printers and colour copiers based upon digital colour data processed in the computer. According to the developments of these arts it has become necessary to transform colour data for use in various different colour reproduction systems or devices with a high precision of prediction of reproduced colours on the display thereof in a computer, also with availability of modifications colour data based upon the computer display thereof.

However, the electronic, or numerical, colour data based upon various different colour reproduction systems or devices are generally not based upon comparable scales and/or not distributed in comparable ranges, while on the other hand the correspondence between the colours displayed in a monitor and the colours reproduced by colour reproduction devices such as colour printers, colour copiers, etc. varies widely in accordance with the varieties of the colour reproduction performances depending upon physical, chemical and/or technical factors particular to respective colour processing or reproduction systems or devices. Therefore, it has been attempted to compensate for such differences in the scale and/or range of distribution of colour data and/or in the correspondence in colour reproduction in various colour processing or reproduction systems or devices, so that the reproduction of colour is more accurately predicted.

Conventionally, the compensation for the difference in colour reproduction according to different colour reproduction systems or devices has been generally made by referring to look-up tables prepared for such compensation, with a help of interpolation when required data points are not available in such tables. It has also been tried to conceive the problem of solving the compensation for a difference in colour or distribution of colour data in a colour space as a problem with regard to geometric transformation, like the geometric rotation or shifting of images, and to apply a geometric linear transformation to such compensation. Further, it has also been tried to use the art of matrix transformation or solving linear equations to compensate for a difference in the correspondence in the computer colour data and/or the colour reproduction performances of various colour reproduction systems or devices.

However, the table look up method requires a large number of data, and nevertheless is not satisfactory in its precision, because a linear interpolation is applied to nonlinear colour spaces, resulting in a considerable discrepancy between a colour predicted and a colour actually reproduced. Mathematical approaches such as the geometric linear transformation, matrix transformation and solving linear equations are also not satisfactory, because they are also dependent upon a linear interpolation applied to nonlinear colour spaces.

SUMMARY OF THE INVENTION

It is therefore the primary object of the present invention to provide an improved method of or an improved device for nonlinearly transforming colour information for use in various different colour processing or reproduction systems or devices at higher precision, in less time, for broader adaptability.

It is a further particular object of the present invention to provide an improved method of or an improved device for nonlinearly transforming a combination of at least three colour data to corresponding coordinate values in a uniform colour space at higher precision, in less time, for broader adaptability.

It is a still further particular object of the present invention to provide an improved method of or an improved device for nonlinearly transforming coordinate values in a uniform colour space to a corresponding combination of at least three colour data at higher precision, in less time, for broader adaptability.

It is a still further particular object of the present invention to provide an improved method of or an improved device for nonlinearly transforming coordinate values in a uniform colour space for adaptation to different colour processing or reproduction systems or devices at higher precision, in less time, for broader adaptability.

According to the present invention, the above-mentioned primary object of providing an improved method is accomplished by a method of transformation of colour information for use in different colour processing systems or devices, comprising a nonlinear transformation thereof by a neural network trained of the transformation.

The transformation according to the present invention is more desirably carried out by a multi-layered feedforward neural network.

For the nonlinear transformation according to the present invention the colour information may include a combination of at least three colour data and coordinate values in a uniform colour space corresponding to one another, and said nonlinear transformation may be carried out between said colour data and said coordinate values. In this case, three colour data may be three fundamental colours for reproducing colours according to the subtractive colour mixing. Or, the three colour data may be three fundamental colours for reproducing colours according to the additive colour mixing. Further, the three colour data may be hue, chroma and value of colour.

Further, the nonlinear transformation according to the present invention may be a transformation from said colour data to said coordinate values in the uniform colour space. Or, the nonlinear transformation according to the present invention may be a transformation from said coordinate values in the uniform colour space to said colour data. Further, the nonlinear transformation according to the present invention may be an adaptation of said coordinate values in the uniform colour space for use in different colour processing or reproduction systems or devices.

Further, the nonlinear transformation of colour information according to the present invention is desirably carried out by a device comprising a three to five layered feedforward neural network having an input layer including at least three units of neural circuits, one to three intermediate layers each including at least one unit of neural circuits, and an output layer including at least three units of neural circuits, said neural network having been trained of a transformation of colour information inputted to said input layer to colour information outputted from said output layer.

The above-mentioned device may further comprise an input means for transforming a combination of at least three colour data to corresponding electric signals, said neural network transforming said electric signals received from said input means to corresponding coordinate values in a uniform colour space, and an output means for outputting the transformed coordinate values from said neural network, or may alternatively further comprise an input means for transforming coordinate values in a uniform colour space to corresponding electric signals, said neural network transforming said electric signals received from said input means to a corresponding combination of at least three colour data, and an output means for outputting the transformed colour data from said neural network.

BRIEF DESCRIPTION OF THE DRAWINGS

In the accompanying drawing.

DESCRIPTION OF THE PREFERRED EMBODIMENTS

In the following the present invention will be described in more detail with respect to some preferred embodiments with reference to the accompanying drawings.

Figure 1:
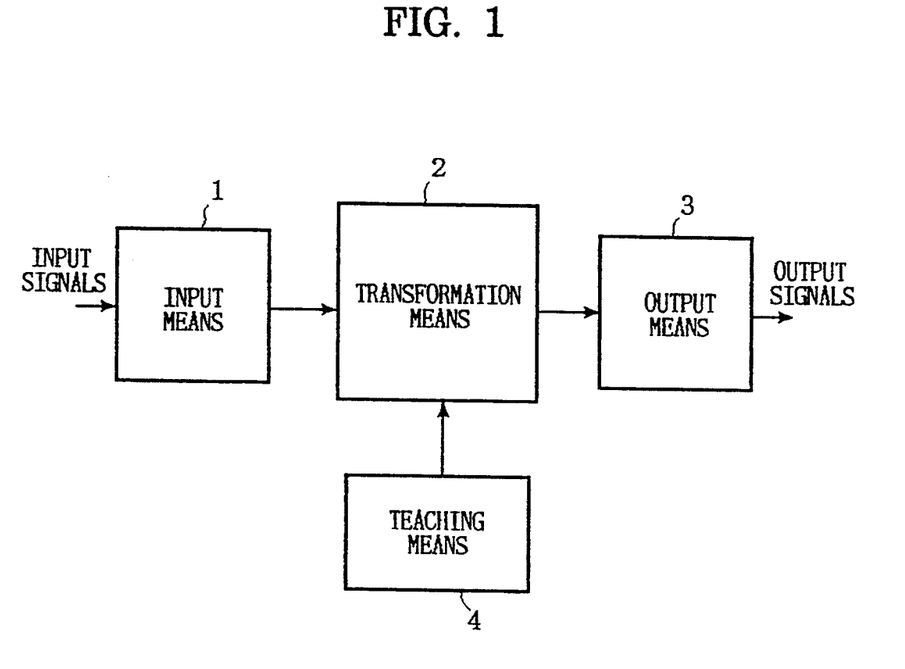
FIG. 1 is a diagrammatical illustration of the basic construction for nonlinear transformation of colour information according to the present invention.

The device for nonlinear transformation of colour information according to the present invention may have a general construction as diagrammatically shown in FIG. 1, including an input means 1, a transformation means 2, an output means 3, and a teaching means 4. The input means 1 receives input colour signals such as a combination of three colour data such as CMY or CMYK in the subtractive colour mixing, RGB in the additive colour mixing, or three psychological attributes of colour such as hue, chroma and value, or coordinate values in a uniform colour space such as L*a*b*, and transforms them to corresponding electric signals. The transformation means 2 carries out a nonlinear transformation of the input colour information in the form of the electric signals to corresponding colour information by means of a neural network described in detail hereinbelow. The output means 3 outputs the colour information transformed by the neural network in an appropriate form of signals required therefor. The teaching means 4 teaches the neural network in the transformation means 2 as described hereinbelow so that the neural network acquires by training an ability of carrying out the required transformation.

When the input means 1 transforms a combination of colour data to corresponding electric signals, it analyses the colour data, and generates a set of electric signals representing quantities of CMY or CMYK in the subtractive colour mixing, RGB in the additive colour mixing, or three psychological attributes of colour such as hue, chroma and value.

Figure 2:
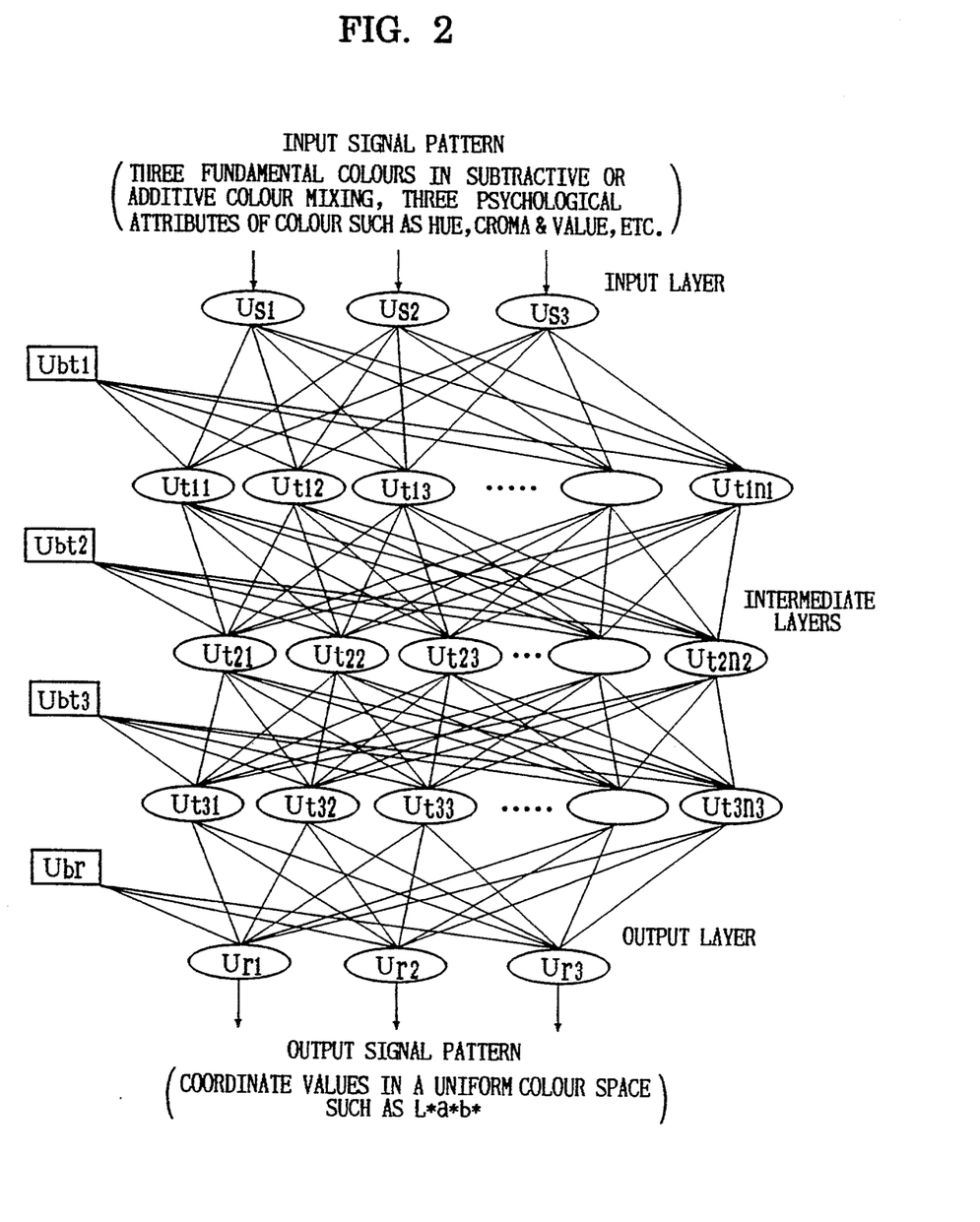
FIG. 2 is a diagrammatical illustration of an embodiment of a multi-layered feedforward neural network to provide the transformation means in the construction shown in FIG. 1.

The neural network which provides the transformation means 2 is a multi-layered feedforward neural network as exemplarily shown in FIG. 2, including units of neural circuits Us1, Us2, ... combined to form a multi-layered construction. The shown embodiment has an input layer including three neural units Us1, Us2 and Us3, the number of which corresponds to the number of colour data such as fundamental colours CMY in the subtractive colour mixing or RGB in the additive colour mixing, or hue, chroma and value of the three psychological attributes of colour. Further, the shown neural network has three intermediate layers each including n1, n2 and n3 units of neural circuits such as Ut11, Ut12, ..., Ut21, U122, ..., and Ut31, Ut32, .... Further, the neural network has an output layer including three units of neural circuits Ur1, Ur2 and Ur3, the number of which also corresponds to the number of coordinates values in a uniform colour space such as L*a*b*. The units of neural circuits in the intermediate layers and the output layer are each supplied with bias signals from bias units Ubt1, Ubt2, Ubt3 and Ubr, respectively.

When a combination of colour information data are supplied to the input layer as a pattern of input signals, the neural network transmits the signals progressively forward from the input layer through the intermediate layers toward the output layer so as thereby to provide coordinate values in a uniform colour space such as L*a*b* in the output layer.

Denoting the output amounts of
units Usi in the input layer by Ii (i=1, 2, 3),
units Utjk in the intermediate layer by Hjk (j=1, 2, 3 k=1, 2, ... n1, n2 or n3), and
units Urm in the output layer by Om (m=1, 2, 3),
denoting the connection coefficients between units Usi in the input layer and units Ut1k in the first intermediate layer by Wst1, those between the units in the adjacent intermediate layers by Wttjk, and those between units Ut3k in the last intermediate layer and units Urm in the output layer by Wt3r, and denoting biasing factors for units Utjk in the intermediate layers by Qtj and a biasing factor for units Urm in the output layer by Qr, then $$H1k = func\ (SUM\ Ii \cdot Wst1 + Qt1,\ i=1-3) \quad (1)$$

$$H2k = func\ (SUM\ H1k \cdot Wtt12 + Qt2,\ k=1-n1) \quad (2)$$

$$H3k = func\ (SUM\ H2k \cdot Wtt23 + Qt3,\ k=1-n2) \quad (3)$$

$$Om = func\ (SUM\ H3k \cdot Wt3r + Qr,\ k=1-n3) \quad (4)$$

wherein "SUM" means summation, and "func" is a non decreasing sigmoid function the output of which monotonously increases in the range of (0, 1), as generally expressed by:

$$func\ (x) = 1/\{1 + exp(-x)\} \quad (5)$$

The amounts of output relative to the amounts of input of the neural network are determined by such variable as the connection coefficients Wst1, Wtt12, Wtt23 and Wt3r and the biasing factors Qt1, Qt2, Qt3 and Qr. The values of these variables are determined by a training described hereinbelow with reference to FIG. 3.

Figure 3:
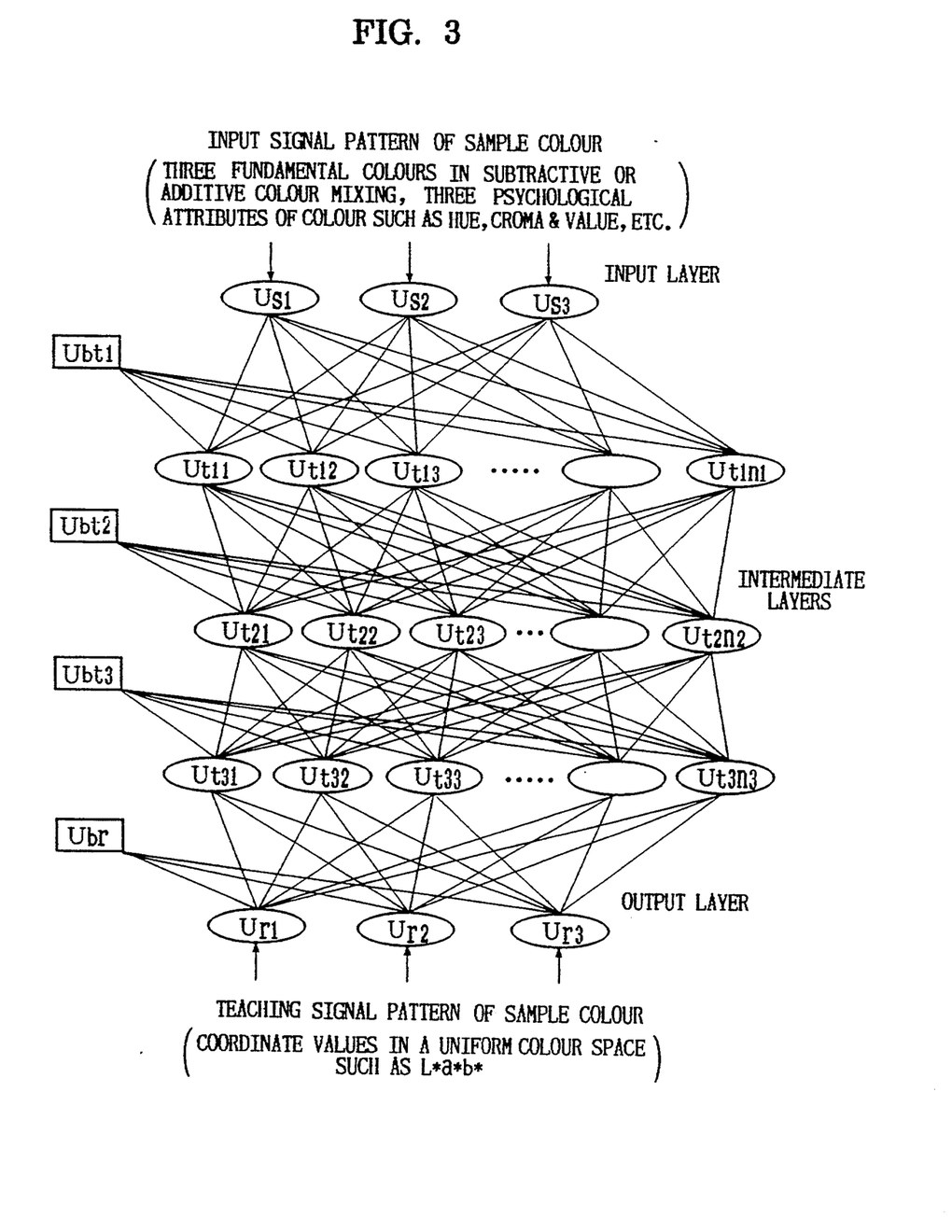
FIG. 3 is a view similar to FIG. 2, showing the neural network in a training state.

FIG. 3 shows a manner of teaching the neural network, or letting the neural network learn, the transformation to be carried out thereby, according to a back propagation method. To do this, several samples of colours of which the corresponding coordinate values in a uniform colour space are known are prepared, then the colour data such as the amounts of CMY in the subtractive colour mixing, RGB in the additive colour mixing, or hue, chroma and value in the perception of colours are transformed to corresponding electric signals, and then those electric signals are supplied to the input layer of the neural network as an input pattern of electric signals, while on the other hand, the known corresponding amounts of the coordinate values are transformed to corresponding electric signals, and are supplied to the output layer of the neural network as a teaching pattern of output signals, and the connection coefficients and the biasing factors are modified repeatedly backward from the output layer to the input layer so that the square error between the output signal pattern and the teaching signal pattern is minimized.

It has been confirmed that, when the neural network has been trained for the transformation with respect to several samples, the neural network gains an ability of nonlinearly transforming such colour data as a combination of CMY in the reduction colour mixing or RGB in the additive colour mixing or a combination of hue, chroma and value in the perception of colours to corresponding coordinate values in a uniform colour space, so that the neural network provides good results in the same kind of transformation with respect to other colour data different from the samples.

Figure 4:
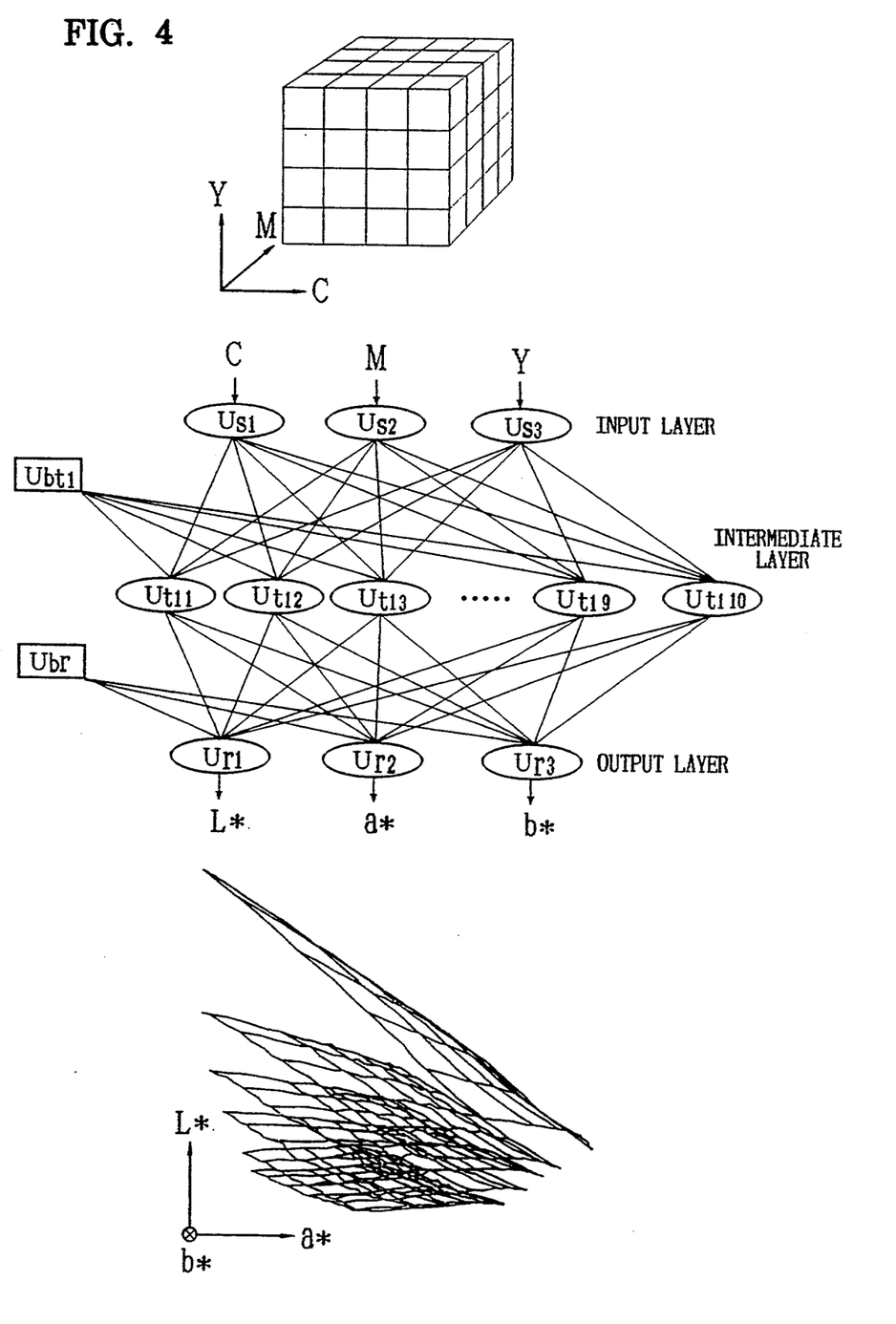
FIG. 4 is a diagrammatical illustration of a more concrete embodiment of the same kind of neural network as the neural network shown in FIG. 2, by which an example of CMY dot area size values shown at an upper portion of the figure is transformed to corresponding L*a*b* coordinates in a uniform colour space shown at a lower portion of the figure.

FIG. 4 shows a more detailed embodiment of the neural network shown in FIG. 2, having a single intermediate layer including ten units of neural circuits, by which CMY colour data such as shown at an upper portion of the figure has been transformed to corresponding coordinate values L*a*b* in a uniform colour space shown at a lower portion of the figure. It will be appreciated that the neural network shown in FIG. 4 is equivalent to the neural network shown in FIG. 2 when j is equal to 1 and k is equal to 10. The correspondence between CMY and L*a*b* is such as illustrated in FIG. 4.

Figure 5:
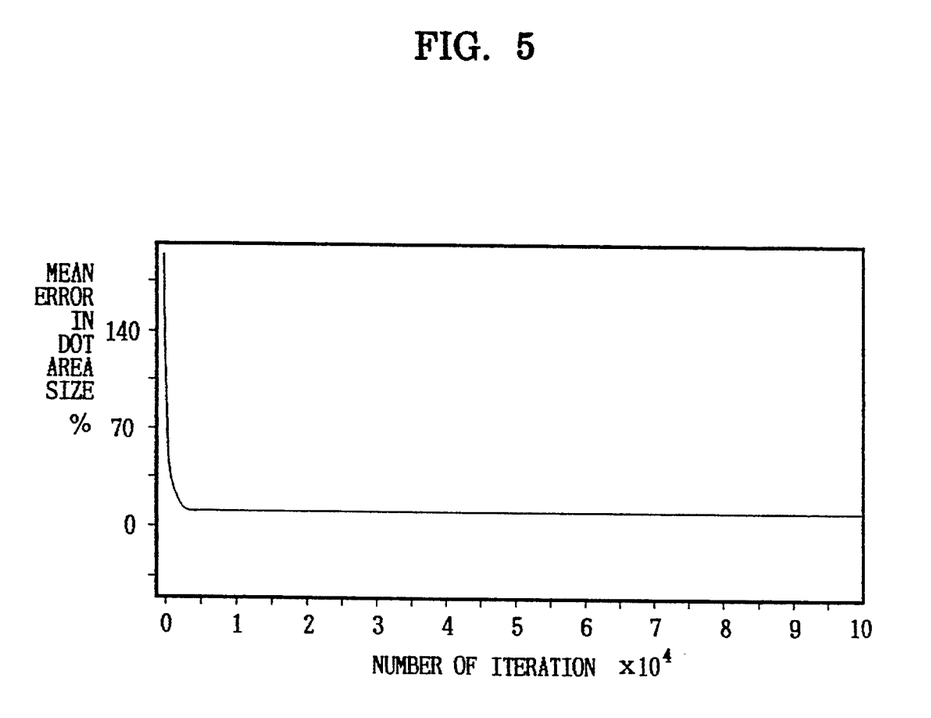
FIG. 5 is a graph showing an example of the learning performance of the neural network shown in FIG. 4.

FIG. 5 shows the progress of the training exhibited by the neural network shown in FIG. 4, the training having been conducted by using eight samples of colours, wherein the abscissa represents number of iteration of learning, while the ordinate represents mean errors in dot area size. It will be appreciated that the neural network having a single intermediate layer including ten units of neural circuits completes its learning with a relatively small number of iteration of learning, and provides good results for the same kind of transformation of colour information with respect to other colours different from the eight samples for training.

Figure 6:
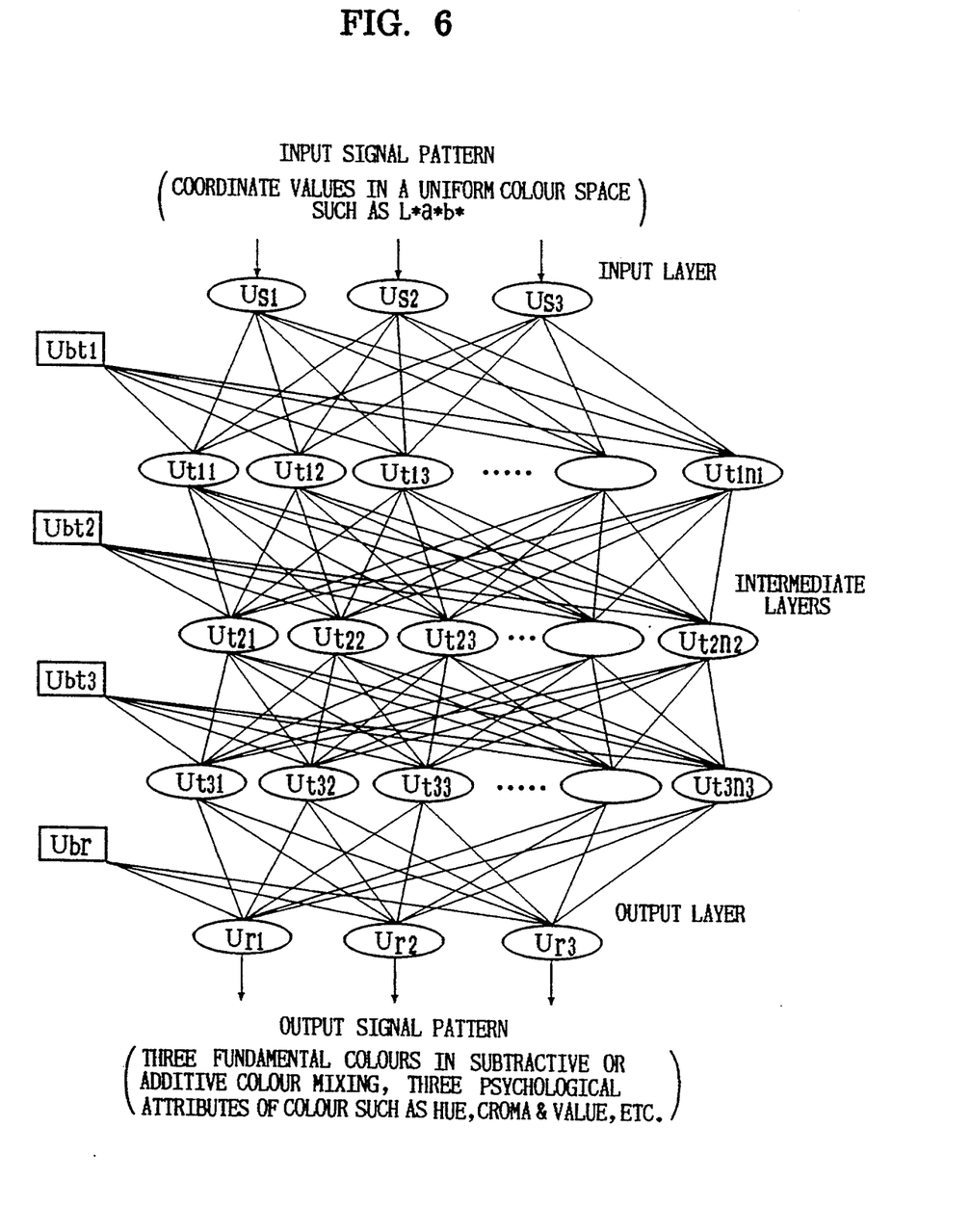
FIG. 6 is a view similar to FIG. 2, showing another embodiment of a multi-layered feedforward neural network to provide the transformation means in the construction shown in FIG. 1, adapted to transform coordinate values in a uniform colour space to a combination of three colour data.

FIG. 6 shows another embodiment of the neural network to constitute the transformation means 2 in FIG. 1. The neural network shown in FIG. 6 has substantially the same construction as the neural network shown in FIG. 2, except that the neural network in FIG. 6 is constructed to transform coordinate values in a uniform colour space such as L*a*b* to a corresponding combination of colour data such as three fundamental colours in the subtractive or additive colour mixing or hue, chroma and values in the perception of colours. It will be understood that the same mathematical calculations as equations (1)–(5) are applicable to the neural network shown in FIG. 6. Further, it will also be understood that the neural network shown in FIG. 6 may be trained in a manner shown in FIG. 7, as the neural network shown in FIG. 2 is trained in the manner shown in FIG. 3. So, as shown in FIG. 7, for its training, several samples of coordinate values in a uniform colour space such as L*a*b* of which the corresponding combination of colour data such as three fundamental colours in the subtractive or additive colour mixing or hue, chroma and value in the perception of colours are known are prepared, the coordinate values in the uniform colour space are transformed to corresponding input patterns of electric signals and supplied to the input layer, while the corresponding combinations of colour data are transformed to corresponding, teaching pattern of electric signals and supplied to the output layer, and the connection coefficient and the biasing factors are modified repeatedly backward from the output layer toward the input layer so that the discrepancy between the output signal pattern and the teaching signal pattern is minimized.

Figure 7:
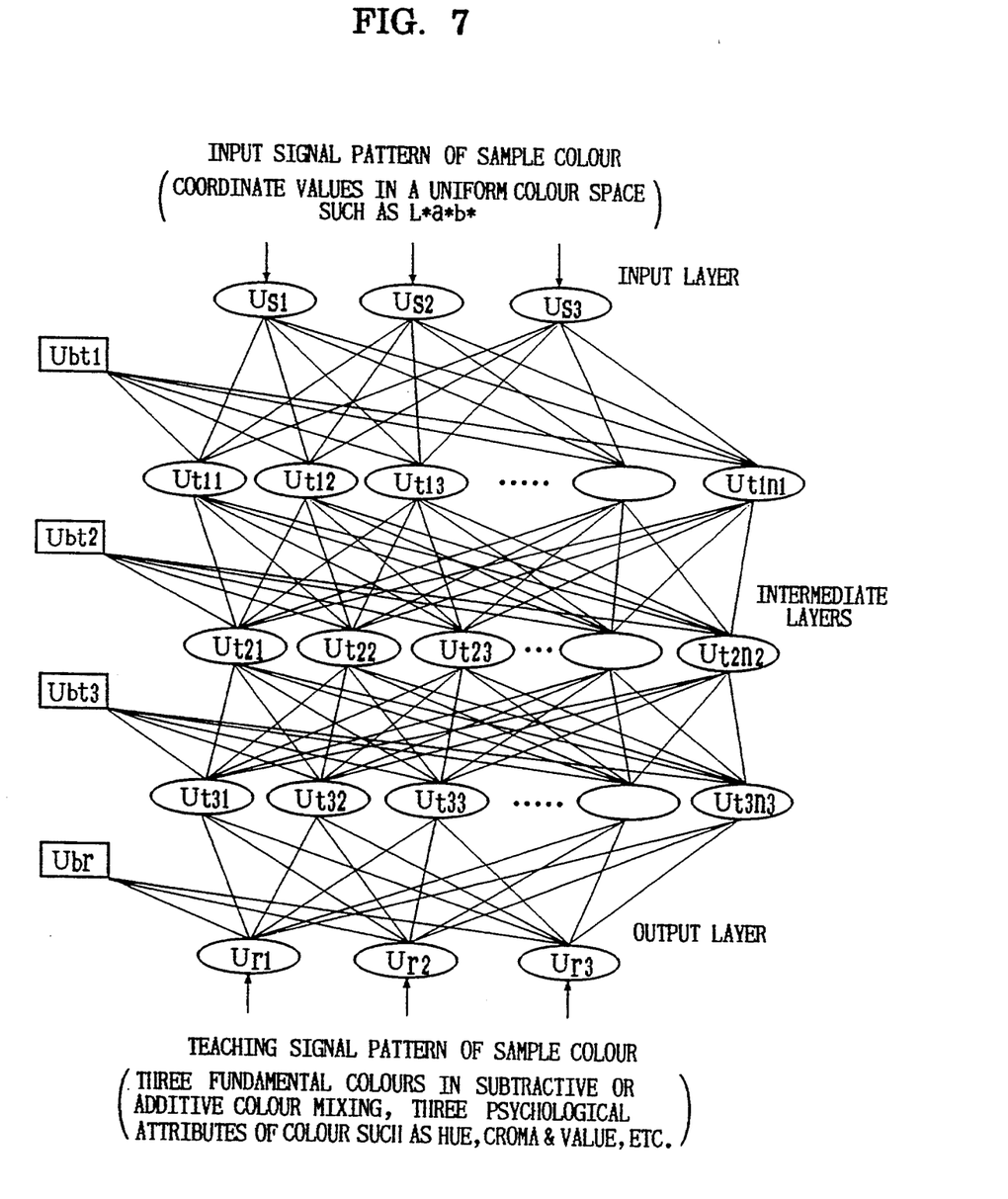
FIG. 7 is a view similar to FIG. 6, showing the neural network in a training state.
Figure 8:
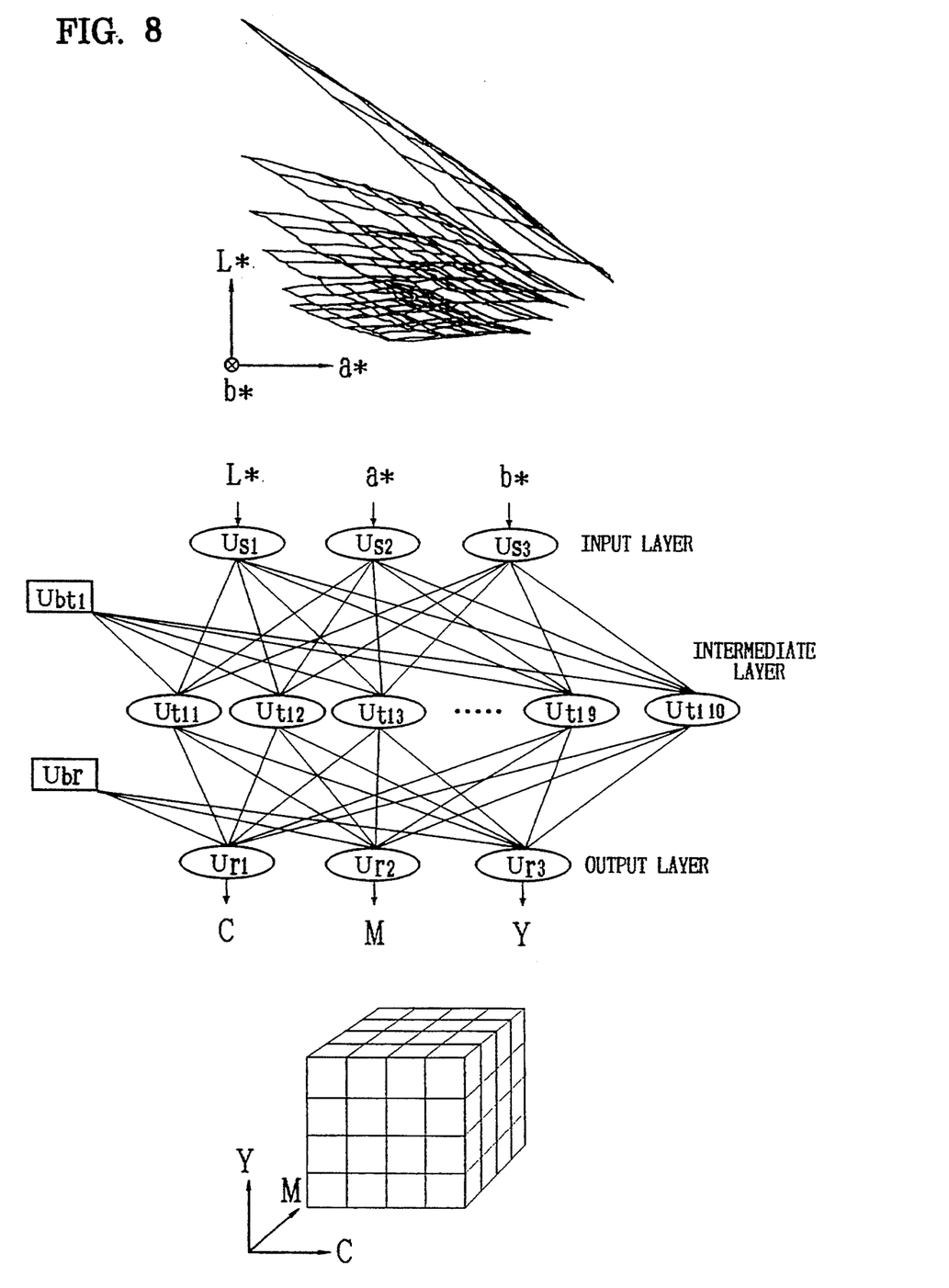
FIG. 8 is a diagrammatical illustration of a more concrete embodiment of the same kind of neural network as the neural network shown in FIG. 6, by which an example of L*a*b* coordinates in a uniform colour space shown at an upper portion of the figure is transformed to corresponding CMY dot area size values shown at a lower portion of the figure.
Figure 9:
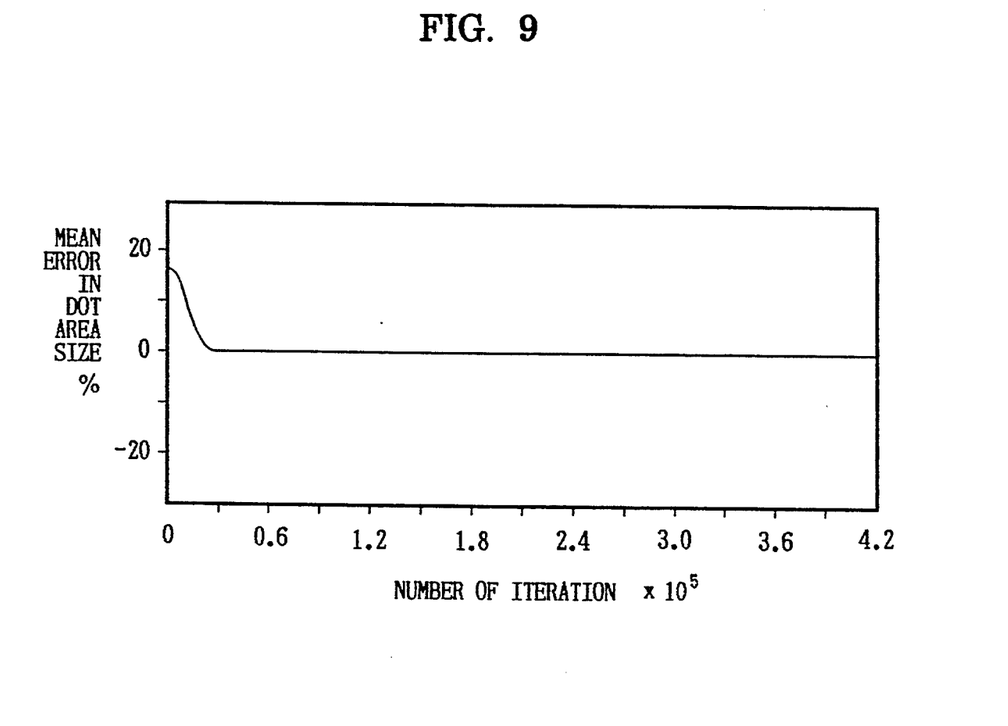
FIG. 9 is a graph showing an example of the learning performance of the neural network shown in FIG. 8.

FIG. 8 is a more detailed embodiment corresponding to the embodiment shown in FIG. 7, also having a single intermediate layer including ten units of neural circuits, as the embodiment shown in FIG. 4, and being able to transform coordinate values L*a*b* shown at an upper portion of the figure to a combination of CMY shown at a lower portion of the figure. The same eight samples as used for training the neural network shown in FIG. 4 were used for training the neural network shown in FIG. 8. The progress of training is shown in FIG. 9. From these results, it will be appreciated that the neural network having a single intermediate layer including ten units of neural circuits is also operative with substantially the same ability in the transformation of coordinate values L*a*b* in a uniform colour space to a combination of CMY as in the transformation from a combination of CMY to coordinate values L*a*b* in a uniform colour space.

Figure 10:
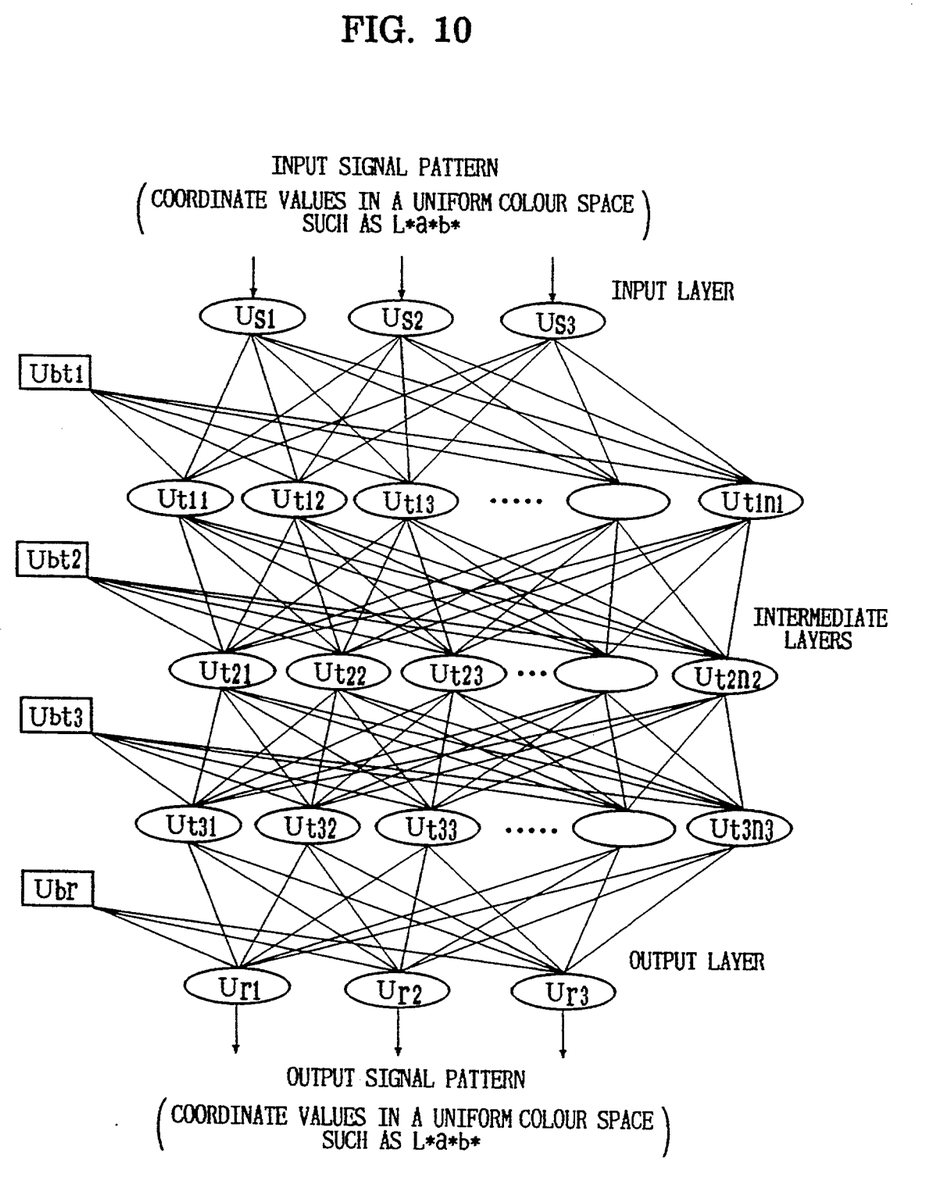
FIG. 10 is a view similar to FIGS. 2 or 6, showing still another embodiment of a multi-layered feedforward neural network to provide the transformation means in the construction shown in FIG. 1, adapted to transform coordinate values in a uniform colour space for adaptation thereof between different colour information processing systems or devices.
Figure 11:
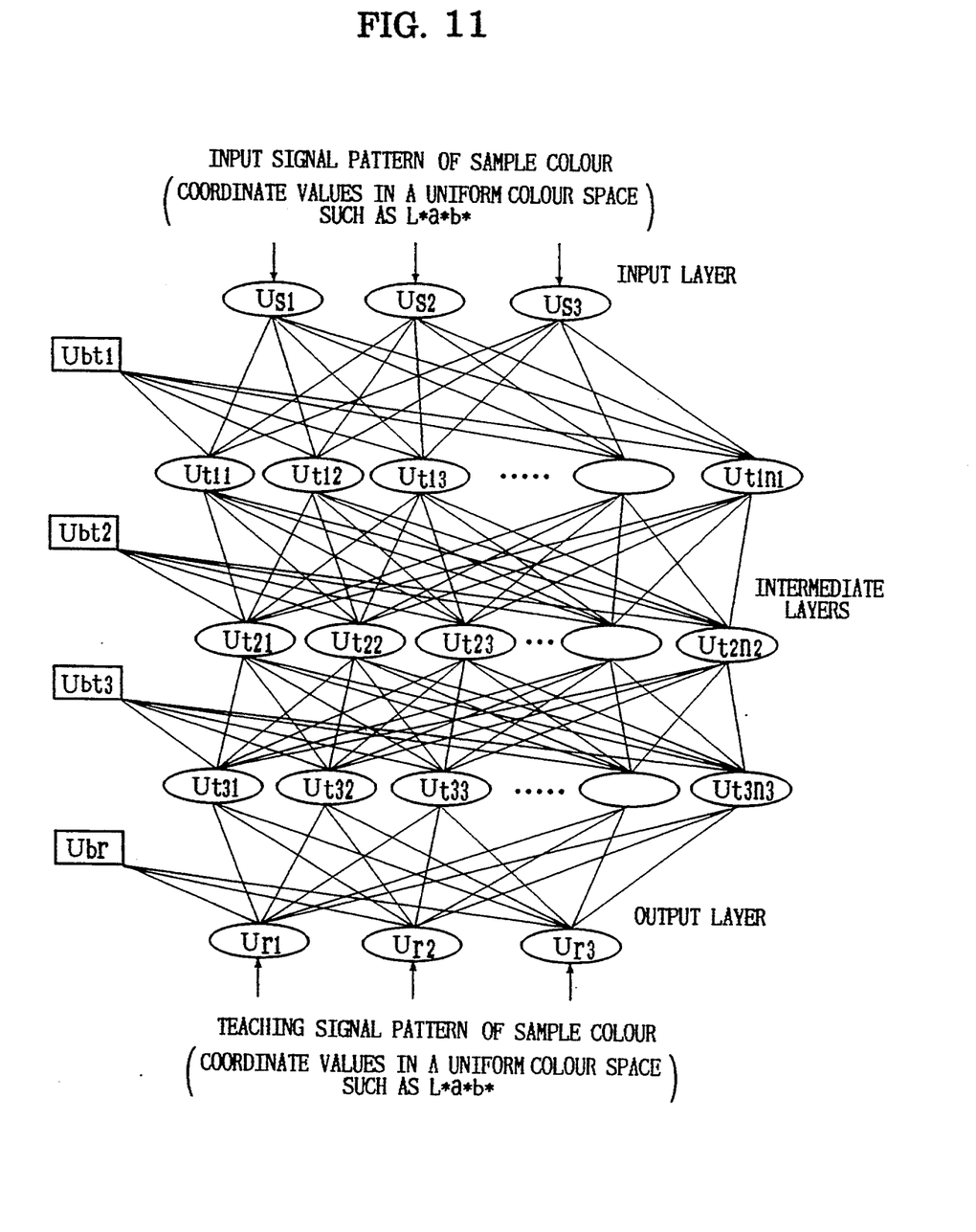
FIG. 11 is a view similar to FIG. 10, showing the neural network in a training state.

FIG. 10 shows a still another embodiment of the neural network to constitute the transformation means 2 in FIG. 1. The neural network shown in FIG. 10 has substantially the same construction as the neural network shown in FIG. 2 or FIG. 6, except that the neural network in FIG. 10 is constructed to make a transformation in coordinate values in a uniform colour space such as L*a*b* in order to adapt such coordinate values particular to one colour information processing or reproduction system or device to such coordinate values particular to another colour information processing or reproduction system or device. It will also be understood that the same mathematical analyses as equations (1)–(5) are applicable to the neural network shown in FIG. 10. Further, it will also be understood that the neural network shown in FIG. 10 may be trained in a manner shown in FIG. 11, as the neural network shown in FIG. 2 or FIG. 6 is trained in the manner shown in FIG. 3 or FIG. 7, respectively. So, as shown in FIG. 11, for its training, several samples of coordinate values in a uniform colour space such as L*a*b* of which the correspondence of those values between two different colour processing or reproduction systems or devices are known are prepared, and the coordinate values in the uniform colour space in one of them are transformed to corresponding input pattern of electric signals and supplied to the input layer, while the coordinate values in the uniform colour space in the other of them are transformed to corresponding teaching pattern of electric signals and supplied to the output layer, and the connection coefficient and the biasing factors are modified repeatedly backward from the output layer toward the input layer so that the discrepancy between the output signal pattern and the teaching signal pattern is minimized. A transformation device incorporating the neural network shown in FIG. 10 is operable in combination with a transformation device incorporating the neural network shown in FIG. 2, or a transformation device incorporating the neural network shown in FIG. 6, or in combination with both.

Thus it will be appreciated that according to the present invention the non linearity in the relation between such colour information as a combination of fundamental colours in the subtractive or additive colour mixing or hue, chroma and value in the perception of colours and such colour information as coordinate values in a uniform colour space or in the comparison of coordinate values in a uniform colour space particular to various colour information processing or reproduction systems or devices is relatively easily compensated for by the nonlinear transformation ability of neural network, particularly a multi-layered feedforward neural network, the ability having been obtained by training.

Although the invention has been described in detail with respect to some preferred embodiments thereof, it will be clear to those skilled in the art that various modifications are possible with respect to those shown embodiments within the scope of the present invention.

We claim:

1. A method for controlling color reproduction performance of color reproduction devices by use of a first multi-layered feedforward neural network having an input layer including at least three units of neural circuits, at least one intermediate layer including at least one unit of neural circuit, and an output layer including at least three units of neural circuits, and a second multi-layered feedforward neural network having an input layer including at least three units of neural circuits, at least one intermediate layer including at least one unit of neural circuit, and an output layer including at least three units of neural circuits, said method comprising the steps of:

training said first neural network by supplying said input layer thereof with sample color data in a first set of parameters employed by a first color reproduction device selected from CMY or CMYK in substractive color mixing and RGB in additive color mixing and by supplying said output layer thereof with sample color data according to a uniform color space, said sample color data supplied to said output layer thereof being already known to correspond to said sample color data supplied to said input layer thereof according to said first color reproduction device, while adjusting a connection coefficient of each neural circuit and biasing factors applied to each neural circuit, so that said first neural network learns a color reproduction performance of said first color reproduction device with respect to a correspondence between color data in said first set of parameters and said uniform color space;

inputting to said input layer of said first neural network a set of color data of an optional color reproducible by said first color reproduction device in said first set of parameters, while outputting at said output layer of said first neural network a set of corresponding color data according to said uniform color space;

training said second neural network by supplying said input layer thereof with sample color data according to said uniform color space and by supplying said output layer thereof with sample color data in a second set of parameters employed by a second color reproduction device selected from CMY or CMYK in the substractive color mixing and RGB in the additive color mixing, said sample color data supplied to said output layer thereof being already known to correspond to said sample color data supplied to said input layer thereof according to said second color reproduction device, while adjusting a connection coefficient of each neural circuit and biasing factors applied to each neural circuit, so that said second neural network learns a color reproduction performance of said second color reproduction device with respect to the correspondence between color data in said uniform color space and said second set of parameters; and inputting to said input layer of said second neural network said set of color data according to said uniform color space corresponding to said optional color reproducible by said first color reproduction device, while outputting at said output layer of said second neural network a set of corresponding color data in said second set of parameters for reproduction of said optional color by said second color reproduction device.

2. A device for controlling color reproduction performance of color reproduction devices, comprising:
a first multi-layered feedforward neural network having an input layer including at least three units of neural circuits, at least one intermediate layer including at least one unit of neural circuit, and an output layer including at least three units of neural circuits, said first neural network having been trained by supplying said input layer thereof with sample color data in a first set of parameters selected from CMY or CMYK in substractive color mixing and RGB in additive color mixing and by supplying said output layer thereof with sample color data according to a uniform color space, said sample color data supplied to said output layer thereof being already known to correspond to said sample color data supplied to said input layer according to a first color reproduction device, while adjusting a connection coefficient of each neural circuit and biasing factors applied to each neural circuit, so that said first neural network learns a color reproduction performance of said first color reproduction device with respect to a correspondence between color data in said first set of parameters and said uniform color space; and
a second multi-layered feedforward neural network having an input layer including at least three units of neural circuits, at least one intermediate layer including at least one unit of neural circuit, and an output layer including at least three units of neural circuits, said second neural network having been trained by supplying said input layer thereof with sample color data according to said uniform color space and by supplying said output layer thereof with sample color data in a second set of parameters selected from CMY or CMYK in the substractive color mixing and RGB in the additive color mixing, said sample color data supplied to said output layer thereof being already known to correspond to said sample color data supplied to said input layer according to said second color reproduction device, while adjusting a connection coefficient of each neural circuit and biasing factors applied to each neural circuit, so that said second neural network learns a color reproduction performance of said second color reproduction device with respect to the correspondence between color data in said uniform color space and said second set of parameters.

3. A method for controlling color reproduction performance of a color reproduction device by use of a multi-layered feedforward neural network having an input layer including at least three units of neural circuits, at least one intermediate layer including at least one unit of neural circuit, and an output layer including at least three units of neural circuits, said method comprising the steps of:
training said multi-layered feedforward neural network by supplying said input layer with sample color data either (i) in a first set of parameters selected from CMY or CMYK in substractive color mixing and RGB in additive color mixing or (ii) in a second set of parameters according to a uniform color space and by supplying said output layer thereof with sample color data either in said second set of parameters or in said first set of parameters, respectively, said sample color data supplied to said output layer being already known to correspond to said sample color data supplied to said input layer, while adjusting a connection coefficient of each neural circuit and biasing factors applied to each neural circuit, so that said neural network learns a color reproduction performance of the color reproduction device with respect to a correspondence between said sample color data in said first and second set of parameters; and
inputting to said input layer a set of color data of an optional color reproducible by said reproduction device in said first or second set of parameters, while outputting at said output layer a set of corresponding color data either in said second or first set of parameters, respectively.

4. A device for controlling color reproduction performance of a color reproduction device, comprising a multi-layered feedforward neural network having an input layer including at least three units of neural circuits, at least one intermediate layer including at least three units of neural circuits, at least one intermediate layer including at least one unit of neural circuit, and an output layer including at least three units of neural circuits, said neural network having been trained by supplying said input layer with sample color data either (i) in a first set of parameters selected from CMY or CMYK in the substractive color mixing and RGB in the additive color mixing or (ii) in a second set of parameters according to a uniform color space and by supplying said output layer with sample color data either in said second set of parameters or in said first set of parameters, respectively, said sample color data supplied to said output layer being already known to correspond to said sample color data supplied to said input layer, while adjusting a connection coefficient of each neural circuit and biasing factors applied thereto, so that said neural network learns a color reproduction performance of color reproduction device with respect to the correspondence between said sample color data in said first and second set of parameters.

* * * * *